Aug. 30, 1960  A. HAGE  2,950,891
BICYCLE FENDER BRACKET
Filed Feb. 17, 1958

INVENTOR.
ALBERT HAGE
BY Malcolm W. Fraser
ATTORNEY

United States Patent Office 2,950,891
Patented Aug. 30, 1960

2,950,891

BICYCLE FENDER BRACKET

Albert Hage, 3700 Roanoke St., Toledo, Ohio

Filed Feb. 17, 1958, Ser. No. 715,679

2 Claims. (Cl. 248—226)

This invention relates to brackets for attachment to bicycle fenders for displaying license plates for example, and an object is to produce a new and improved bicycle fender bracket, which cannot only be applied to relatively wide fenders but also to relatively narrow fenders, such as are installed on British bicycles.

Another object is to produce a bicycle fender bracket having the new and improved features of construction, arrangement, operation and choice of materials hereinafter described.

Other objects and advantages of the invention will hereinafter appear and for purposes of illustration but not of limitation, an embodiment of the invention is shown on the accompanying drawings in which Figure 1 is a side edge elevation of a bicycle fender bracket mounted on a bicycle fender of the relatively wide type;

Figure 3 is an elevation of the bicycle fender bracket clamped to a relatively wide bicycle fender, the same being taken substantially on the line 4—4 of Figure 1.

Figure 1:
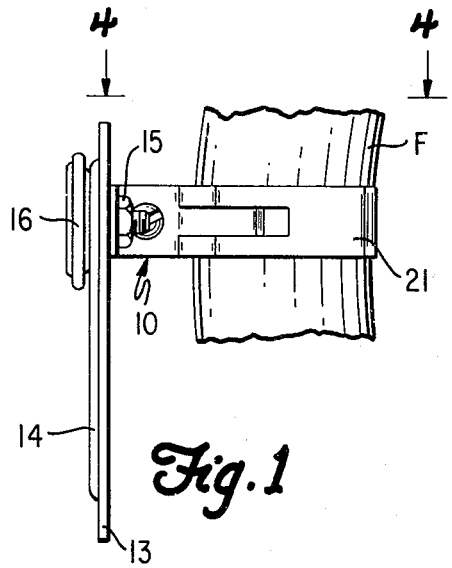

The illustrated embodiment of the invention comprises a bicycle fender F which is shown in fragment on Figure 1 and which is of the relatively wide type such as is more or less standard in the United States. Attached to the fender F is a bracket assembly 10. The bracket assembly 10 comprises a pair of clamping members which are substantially identical with each other. Each clamping member comprises an elongate arm 11 of sheet metal in substantially strip form. The arm 11 is formed with an elongate slot 12 and abutting against the arms 11 is a relatively stiff backing plate 13 which may be of sheet metal or other relatively stiff sheet material. The bicycle license plate 14 abuts against the outer side of the backing plate 13 and bolt and nut assemblies 15 secure the license plate 14 and backing plate 13 to the elongate arms 11. The bolt members extend through the elongate slots 12 as will be readily understood, there being reflector heads 16 on such bolt and nut assemblies.

Each of the clamping members is formed from a single strip of relatively narrow sheet metal and, as shown, integral with each elongate arm at the inner end thereof and extending at substantially right angles thereto is a relatively short leg 17. In the leg of one of the clamping members is a round hole 18 through which a screw 20 extends. In the other short leg is an integral nut impression or Prestole 19 threadedly to receive the screw 20 thereby to tighten the clamping members relative to the bicycle fender as will hereinafter appear.

Figure 4:
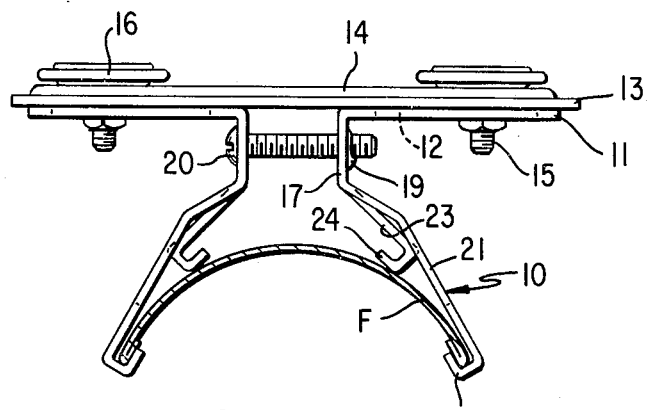

Inclining outwardly and downwardly (Figure 4) from the short leg 17 is a relatively long clamping arm 21. It will be noted that the clamping arm inclines outwardly abruptly from the short leg 17 and in a downward direction and thence extends abruptly downwardly at an angle so that there is a bend in the upper portion of the clamping arm. Each of the arm portions is straight. At the lower end of the clamping arm the metal is bent to form a hook 22 which extends inwardly. It will be understood that the clamping arm inclines outwardly or in a direction generally the same as the elongate arm 11, the hook 22 being inwardly extending or in a direction opposite to such inclination.

In practice the two clamping members are first hooked over the side edge portions of the relatively wide fender F and by applying the screw 20 and tightening up these members, it will be obvious that the assembly is clamped to the fender thereby to hold and retain the backing plate 13 and license plate 14 in a desired position of use which is substantially vertically disposed at the rear of the bicycle.

Figure 2:
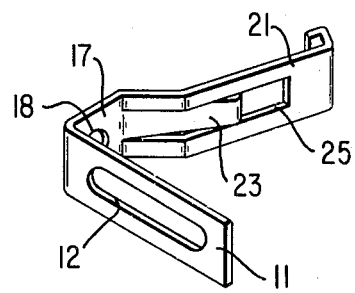
Figure 2 is a perspective view of one of the clamping members.
Figure 5:
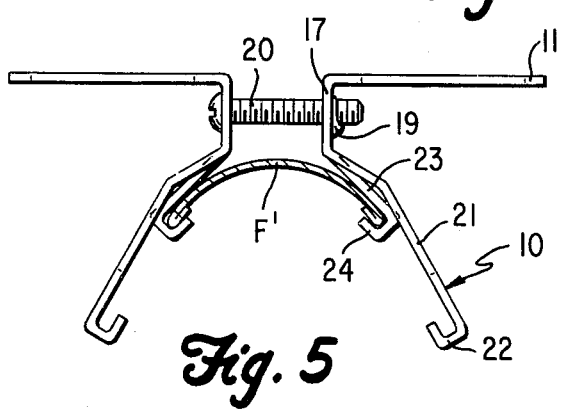
Figure 5 is a view somewhat similar to Figure 4 but showing the bicycle fender bracket mounted on a relatively narrow bicycle fender, such for example as the British type bicycle fender.
Figure 3:
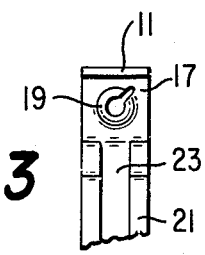
Figure 3 is a side elevation in fragment of one of the clamping members and showing the pressed out nut or Prestole for threadedly receiving a screw.

This bracket is also adapted to engage fenders which are relatively narrow as indicated at F' on Figure 5. The European bicycles, particularly the British bicycles, are equipped with relatively narrow fenders and since so many of these bicycles are in use in the United States, this bracket is designed for use either with the relatively wide fenders F such as are installed on the American bicycles or in connection with the narrower fenders F' of the type used on the British and other European bicycles. For this purpose there is struck from each of the clamping arms 21 a relatively short clamping arm 23. This is accomplished by slitting the metal along parallel lines and transversely. The metal is then pressed inwardly to form the short clamping arm 23. The short arm 23 is integral with the long clamping arm in the region of the connection between the long clamping arm 21 and the short leg 17. On the free end of the short clamping arm 23 is a hook 24 which is disposed inwardly similar to the hook 22. The cutout or slot in the long clamping arm is indicated at 25 on Figure 2. Thus as shown on Figure 5, a relatively narrow fender F' can be clamped by the hooks 24 in the manner above described.

The relatively short clamping arms 23 and hook 24 perform an additional function when used in connection with the relatively wide fenders F. This is shown on Figure 4 in which the end portions of the hooks 24 abut against the outside of the bicycle fender F so that when the screw 20 is tightened the hooks 24 impart a yieldable tension on the fender, thereby to eliminate rattles or vibrational noises and assist in effecting a secure clamping connection between.

Numerous changes in details of constructions, arrangement and operation may be effected without departing from the spirit of the invention, especially as defined in the appended claims.

What I claim is:

1. Bracket for bicycle license plates or the like comprising a pair of clamping members, each member having an elongate arm to abut the rear face of a license plate and be connected thereto, a relatively short leg integral with one end of said arm and disposed at substantially right angles thereto, the leg being apertured and receiving a fastener adjustably connecting the clamping members together, a clamping arm integral with the opposite end of said leg and inclining outwardly therefrom and in direction generally similar to that of said elongate arm, a hook extending inwardly from the free end of said clamping arm, said members being arranged with said short legs disposed oppositely from one another and with the elongate and clamping arms on one member extending respectively oppositely from the elongate and clamping arms on the other member, whereby the hook of each clamping arm is hooked over the respective side edge of a bicycle fender and the fastener connecting said short legs is tightened for securely clamping the members in place, a relatively short clamping arm struck from said first clamping arm, and a hook on the outer end of said short clamping arm thereby to enable the same bracket to be used also for narrower fenders.

2. The organization as claimed in claim 1 in which the hooks on the short clamping arms are disposed in intersecting relationship with respect to a generally arcuate fender engaged within the first-mentioned hooks and yieldably press against the fender when applied to the wider fender thereby to tension the clamping arms and reduce the possibility of rattles.

References Cited in the file of this patent

UNITED STATES PATENTS

| | | |
|---|---|---|
| 392,431 | Higgins | Nov. 6, 1888 |
| 1,750,605 | Price | Mar. 11, 1930 |
| 2,043,041 | Goeddeke | June 2, 1936 |

FOREIGN PATENTS

| | | |
|---|---|---|
| 164,752 | Switzerland | Dec. 16, 1933 |